United States Patent [19]

Lange et al.

[11] 4,205,865

[45] Jun. 3, 1980

[54] LATENT SENSITIZING INK

[75] Inventors: Heinz E. Lange, Saint Paul; Robert J. Maloney, Lake Elmo; Dean A. Ostlie, White Bear Lake, all of Minn.

[73] Assignee: Minnesota Mining and Manufacturing Company, Saint Paul, Minn.

[21] Appl. No.: 906,433

[22] Filed: May 17, 1978

Related U.S. Application Data

[63] Continuation-in-part of Ser. No. 596,180, Jul. 15, 1975, Pat. No. 4,111,462.

[51] Int. Cl.$^2$ .................... B41L 1/20; C09D 11/00
[52] U.S. Cl. .................... 282/27.5; 35/9 G; 101/469; 106/21; 106/29; 106/30; 106/219; 428/914
[58] Field of Search .................... 101/469; 35/9 G; 106/20–32, 219; 282/27.5; 526/281, 282

[56] References Cited

U.S. PATENT DOCUMENTS

| | | | |
|---|---|---|---|
| 3,073,707 | 1/1963 | Clark et al. | 106/22 |
| 3,451,143 | 6/1969 | Thomas et al. | 101/469 X |
| 3,632,364 | 1/1972 | Thomas et al. | 101/469 X |
| 3,632,377 | 1/1972 | Williams | 106/21 X |
| 3,725,104 | 4/1973 | Fralk | 101/469 X |

*Primary Examiner*—Theodore E. Pertilla
*Attorney, Agent, or Firm*—Cruzan Alexander; Donald M. Sell; Warren R. Bovee

[57] ABSTRACT

Latent, sensitizing inks for application to selected areas of substrates by conventional printing methods. The inks comprise a unique vehicle component which is a non-polymeric, oleophilic, organic Arrhenius acid anion having a cationic counter-ion and, in combination with said vehicle component, a thinner and a particulate filler. The latent inks also include at least one color-generating component. A preferred ink comprises as an additional component a polymeric, hydrocarbon, thermoplastic terpene resin which enhances imaging characteristics and allows the use of reduced filler loadings in the composition.

11 Claims, No Drawings

LATENT SENSITIZING INK

This application is a continuation-in-part of copending application Ser. No. 596,180, filed July 15, 1975 now U.S. Pat. No. 4,111,462.

The present invention relates to the art of sensitizing substrates with color generating components so that the sensitized areas, or portions of the sensitized areas, can be subsequently developed, i.e., rendered visible, by contact with a color-activating material. More specifically, latent, sensitizing inks which can be applied to selected areas of substrates by a variety of conventional printing methods are disclosed.

"Carbonless" papers and the art of applying undeveloped, color-generating materials to substrates are known. Previously, the application of these undeveloped or latent color-generating materials involved the coating of the complete surface of substrates using aqueous coating compositions and techniques. These techniques do not lend themselves to the application of the color-generating materials in selected, patterned areas. Accordingly, in order to provide a substrate having imaging capabilities on only a portion of the substrate, other techniques were developed such as desensitizing a portion of the substrate by the application of a desensitizing compound as disclosed in U.S. Pat. No. 3,809,668.

As the art of providing and developing latent images has progressed, particularly in the area of paper-based feedback systems for educational uses, the need for conveniently applying color-generating components in selected areas on substrates such as paper has become more acute. Vapor and pressure transfer techniques have been employed wherein a latent coreactant is applied to selected areas of a paper sheet to provide a latent sensitized area which can be subsequently developed by the application of a second coreactant from a source such as a wax crayon applied to the areas of the sheet containing the latent coreactant. These systems are exemplified by U.S. Pat. Nos. 3,784,394, 3,725,104, 3,682,673, and 3,617,324. Spirit duplication techniques have also been employed to provide concealed images for subsequent development as exemplified in U.S. Pat. Nos. 3,451,143 and 3,632,364.

U.S. Pat. No. 3,632,364 also discloses the application of concealed images by lithographic, stencil, letterpress, gravure, hand stamp, and silk screen techniques. The disclosed method involves the application of a special oxidizing compound, capable of oxidizing an iodide to iodine, to selected areas of a sheet which contains starch or polyvinyl alcohol. Subsequent application of an oxidizable iodide compound in the areas in which the oxidizing compound has been applied to the substrate results in a visible image being formed.

While the prior art vapor and pressure transfer and spirit duplicating techniques have proven useful in providing small numbers of copies containing concealed images, a satisfactory means of providing large quantities of such copies by conventional printing methods using plain paper has been sought. The aforementioned U.S. Pat. No. 3,632,364 requires a special iodide oxidation system in combination with a prepared sheet containing starch or polyvinyl alcohol. U.S. Pat. No. 3,850,649 relates to printing a latent coreactant capable of forming colored complexes with metals by lithographic offset printing techniques. The coreactant is carried in a special two-phase, quick-set ink vehicle suitable for lithographic offset printing. U.S. Pat. Nos. 3,540,909 through 3,540,914 also disclose "colorless" printing inks containing a phenolic polymeric material dissolved in a petroleum solvent. After spot printing, the acidic polymeric material can be contacted with a basic chromogenic material to form a visible image. U.S. Pat. No. 4,063,754 issued Dec. 20, 1977, discloses compositions and processes for providing solventless or "hot-melt" imaging compositions.

The art relating to printing inks and printing methods does not suggest a satisfactory means for providing a latent ink which can be applied to selected areas of plain paper by a variety of conventional printing methods since prior art inks employ vehicles comprising polymeric, film-forming materials, i.e., varnishes, which tend to inhibit the development of latent inks. The present invention has overcome the disabilities of the prior art by providing latent, sensitizing inks comprising a vehicle component which is a non-polymeric, oleophilic, organic, Arrhenius acid anion having a cationic counter-ion and which inks include at least one latent, color-generating component which can provide visible color by contact with a color-activating component. The term "Arrhenius acid" is an art recognized definition which refers to the class of proton donor compounds which donate protons to water molecules in water solution. In a preferred embodiment the improved inks of the present invention comprise a unique polymeric component which is a hydrocarbon thermoplastic terpene resin. This unique polymeric component aids in providing acceptable tack and viscosity like a conventional ink vehicle, yet surprisingly, unlike conventional ink vehicles, causes the surface of the latent ink to remain "open" and receptive to color-forming coreactants. This effect is particularly surprising in view of the tendency of conventional polymeric ink vehicles, e.g. varnishes, to form films which seal the surface of the film and inhibit color-forming reactions. Thus, the addition of this unique polymeric component provides latent inks having improved imaging properties over latent inks not having this component. The disclosed inks can be formulated so that they can be applied to selected areas of substrates by a variety of conventional printing methods.

As used herein, the term "color-generating component" refers to any of the materials known in the carbonless paper art which will become colored or effect the visible coloring of a separate material when contacted with a color-activating component. Thus, the combination of materials is essential for color-formation. For purpose of convenience herein the components in the latent, sensitizing ink will be referred to as the color-generating component, while the component which is subsequently used to develop the color will be called the color-activating component, although the actual components can be interchanged as will be described hereinafter.

The advantageous properties of the inks of this invention are realized through the use of the aforementioned non-polymeric vehicle component. Surprisingly, the vehicle components described herein act as a vehicle for the ink components, including the color-generating components, without inhibiting color development as do the conventional polymeric, film-forming vehicles or binders.

The latent, sensitizing inks comprise, based on the weight of the total ink composition, about 5 to 55% by weight vehicle component which is a non-polymeric, oleophilic, organic, Arrhenius acid anion having a cationic counter ion, up to about 30% by weight thinner and up to about 70% by weight particulate filler. The ink also includes as one of the above components, or as an additional component, at least about 5% by weight of at least one color-generating component. The ratio of filler to the vehicle component is from about 0.5:1 to 6:1. Optionally, and preferably, an improved ink can be prepared by including as an additional component about 20 to 30% by weight polymeric hydrocarbon thermoplastic terpene resin such as are commercially available under the trade name "Piccolyte" (Pennsylvania Industrial Chemical Corp.) and which are composed essentially of polymers of pinene, especially beta-pinene. These polymeric terpene resins possess the unique property, in the environment of the present invention, to crack or "craze" on drying after application so that the surface of the ink remains open and receptive to color-forming coreactants. When this polymeric component is used it has been found that the level of filler can be reduced significantly. Thus, in certain formulations the ratio of filler to non-polymeric vehicle component can now be reduced to levels of about 0.1:1, preferably about 0.2:1, as the lower limit. Other ingredients such as additional tack and viscosity modifiers, antioxidants, wetting agents, optical brighteners and the like can be added as necessary.

The vehicle components described above are preferably the aliphatic, aromatic and alicyclic carboxylic and sulfonic acids containing at least 6 carbon atoms and the cation containing salts of these acids. These vehicle components have sufficiently oleophilic moieties to provide acceptable inking qualities and promote rapid and intense development of the sensitized areas when used in the formulations of this invention. They are particularly effective with the metal complexing color-generating/color-activating components such as the metal/dithiooxamide (DTO)/polyhydric phenol combinations which require a cosolvent reaction medium for rapid, intense development of the sensitized area. Exemplary of these vehicle components are the rosin, stearic, oleic, 2-ethylhexoic, 2-phenylbutyric, benzoic, hydrocinnamic acids and dinonylnaphthalene sulfonic acids as well as the corresponding cation salts of these acids.

The described vehicle components are generally oily liquids or crystalline or amorphous waxy solids and when dispersed or dissolved in a thinner exhibit the desirable binding and viscosity modifying characteristics of conventional polymeric binders with respect to tack, adhesion, and the like, which are essential to the suitability of the inks for application by conventional printing methods.

As noted above the color-generating component can be one of the recited ink components or can be an additional distinct component. For example, the color-generating component can be the recited vehicle component or the filler or both. Alternatively the ink can include a separate transition metal salt as an additional, distinct color-generating component.

In one embodiment, the vehicle component is a color-generating vehicle component which is an oleophilic, organic Arrhenius acid anion containing at least 6 carbon atoms and having a transition metal counter-ion. The transition metal counter-ion forms a colored complex when contacted with a color-activating metal complexing agent, such as dithiooxamide (DTO) and its derivatives and the polyhydric phenols.

The oleophilic anion moiety aids in providing good inking qualities and in promoting the subsequent development of the latent, sensitized ink.

In this embodiment the vehicle component also acts as the color-generating component. Because of this dual characteristic of the vehicle component, these inks are particularly effective to provide greater concentrations off available color-generating component per unit area of the substrate to which the ink is applied than is possible using color-generating components carried in conventional polymeric, film-forming vehicles. Thus, these inks can provide latent sensitized areas which can be more quickly and intensely developed by contact with color-activating components than is possible by formulating inks having color-generating components in conventional ink vehicles, such as conventional lithographic inks containing varnish.

The transition metal counter ion of these color-generating vehicle components is preferably selected from among nickel, copper, iron and cobalt. Generally nickel and iron are preferred because of the dark color these metals produce with conventional color-activating coreactants such as DTO and its derivatives or the polyhydric phenols. Representative color-generating vehicle components which can be used in the present invention are the nickel, iron, and copper derivatives of aliphatic, aromatic and alicyclic carboxylic and sulfonic acids containing at least 6 carbon atoms and combinations thereof. Thus, nickel rosinate, nickel calcium rosinate, nickel 2-ethylhexoate, nickel stearate, nickel 2-phenylbutyrate, nickel oleate, nickel benzoate, nickel hydrocinnamate, nickel dinonylnaphthalene sulfonate, as well as the corresponding copper and iron salts of the above compounds, and mixtures of two or more of the above compounds are useful.

An essential ingredient of the latent, sensitizing inks of the present invention is a particulate filler which can be dispersed in the liquid ink vehicle. These fillers are necessary to maintain the sensitized area suitably receptive to the color-activating material used to develop the latent ink. These fillers can be any of the conventional pigments and extenders which are known in the printing art. The fillers can be chosen so as to be nearly transparent when dispersed in the ink vehicle or can be colored if desired. Thus, when applied to a substrate, the latent, undeveloped ink can be transparent so as to be invisible or can have a color which closely matches or which contrasts with the substrate to which the ink is applied, depending upon the end use of the sensitized substrates.

The filler must be chosen with some care depending on the particular printing method to be employed in its application. Thus, for certain printing techniques, such as wet offset printing, a hydrophobic filler should be used to provide superior results. Inks formulated in this manner can also be used to advantage in dry offset printing. A simple emulsification test can be used to determine whether the fillers are suitably hydrophobic. This test can be performed by grinding the pigment into the desired oil and mixing the resulting dispersion with the desired aqueous offset fountain solution. After thoroughly mixing the pigment-oil combination with the fountain solution, the fountain solution is decanted and the remaining pigment-oil component weighed. If the weight gain is more than 20% by weight the pigment is generally unsuitable for use in wet offset printing. For dry offset printing, a relatively non-hydrophobic filler, such as the colloidal silicas sold commercially under the trade name Cab-O-Sil (Cabot Corporation) may be used if desired.

The ultimate particle size of the filler in the final ink composition should be less than about 10 micrometers and preferably less than about 5 micrometers in order to be readily applied by conventional printing presses.

Representative fillers which can be used are fumed alumina, alumina hydrate, and trihydrate, powdered and fumed anhydrous and particulate colloidal silica, such as the commercially available "Aerosils" and "Cab-O-Sils" (available from Degussa, Inc. and Cabot Corporation, respectively), calcium and magnesium carbonate, barium sulfate, kaolin clay, attapulgite clay, bentonite clay, zeolites, zinc oxide, ureaformaldehyde pigment, and the like.

The filler can comprise up to about 70% by weight of the ink composition. The larger amounts of filler may be necessary on non-absorptive, smooth papers, whereas lower amounts of the fillers can be used where the paper readily absorbs the ink or has a rough surface which aids in keeping the inked surface receptive to the coreactant. For most applications, the filler preferably comprises about 40 to about 60 percent by weight of the ink composition.

Within the range of composition disclosed above, it has been found that the ratio of filler to the aforementioned vehicle component is important. In order to obtain the desired printing characteristics along with superior imaging speed and image intensity when the sensitized areas are contacted with a color-activating component, the ratio of filler to vehicle component should be from about 0.5:1 to about 6:1 and preferably about 1.3:1 to about 4:1. When filler amounts below the 0.5:1 ratio are used, the sensitized areas develop with less speed and intensity. The higher ratios are preferred, but ratios above about 6:1 are generally not satisfactory for use on conventional printing presses.

However, as noted previously when the polymeric hydrocarbon thermoplastic terpene resin is present as an additional component, reduced levels of filler can be used. For most such compositions the filler will comprise up to about 25 percent by weight of the composition and most preferably about 5 to 15 percent by weight. The ratio of filler to non-polymeric vehicle component can also be reduced significantly and can be from about 0.1:1 to about 6:1, preferably about 0.2:1 to 1:1.

As stated previously, certain of the filler components can function as color-generating components. The acidified clays, e.g., kaolin, attapulgite and bentonite clays, and the natural and synthetic zeolites can be used to provide both the color-generating and filling function in the ink composition since they possess the ability to provide an intense color when contacted with the color-activating basic chromogenic materials, i.e. the leuco dyes, which are well known in the carbonless paper art. Generally when these fillers are used as color-generating components the weight percent of the filler should be about 15% by weight or greater to obtain satisfactory color development in the sensitized areas.

The thinners which are used in combination with the aforementioned vehicle components in the inks of the present invention are materials which are known in the printing art. These materials are solvents, diluents, and low viscosity oils which are added to ink to reduce their consistency and tack, thereby modifying the rheological properties of the ink as required for use in a particular printing method. Typical thinner materials are liquid hydrocarbons, caster oils, dialkyl phthalates, trialkyl phosphates such as tributyl phosphate, alkyl carboxylates, low molecular weight alcohols, fatty alcohols, and the like. The amount and type of thinner to be used in any particular composition varies, depending primarily upon vehicle component and the oil-receptive filler employed. A sufficient amount of the thinner is incorporated into the formulation to provide the proper viscosity and tack for the particular printing method employed. Determination of ink tack values as is conventional in the art can be used to determine the proper amount of thinner to be added. Generally up to about 30% by weight of thinner can be used. Preferably the amount of thinner is about 10 to about 25% by weight of the total ink composition.

Although the use in this invention of the aforementioned vehicle components in combination with thinners eliminates the need for conventional varnishes in order to obtain satisfactory inking properties, varnishes can be used in the formulations if desired to modify further the tack, viscosity and other rheological properties where these properties are difficult to obtain with normal combinations of the vehicle component and thinner. Useful varnishes are the drying oils and other naturally occurring and synthetic polymers known in the art such as the phenolics, linseed oils, alkyds, and modified alkyds, nitrocellulose, tung oil, cellulose acetate, ethyl cellulose, and the like. Up to about 40% by weight of varnish, based on the weight of the total ink composition, may be used. Preferably the varnish comprises less than about 10% by weight of the ink composition since these varnishes tend to inhibit subsequent development of the latent inks due to their film-forming properties.

Agents which inhibit the effect of oxygen on the components of the ink, i.e. antioxidants, can also be added to stabilize the ink components and the sensitized areas after development. Useful antioxidants are well known in the printing ink art, and any of the known antioxidants which do not react with the color-generating component can be used. If an antioxidant which reacts with the color-generating component is used, the ink may be undesirably "desensitized" or a colored reaction product may be formed which causes undesirable coloring of the sensitized area.

Exemplary of the antioxidants which can be used are thiourea, hydroquinone, hindered phenols such as alkylated hydroxytoluene, and the like. Preferably the antioxidant comprises less than 10% by weight and most preferably less than about 2.5% by weight of the total ink composition.

Other conventional ink additives can be added to the ink formulation if desired, such as lubricants, optical brighteners, dyes, waxes, buffers, wetting agents and odorants and the like, to improve the application, performance and aesthetic qualities of the ink. Generally these additives comprise less than about 2% by weight of the ink composition and most preferably comprise less than about 0.5% by weight of the total ink composition.

When the filler is, or contains, one of the aforementioned acidified clays or zeolites, the filler itself can be a color-generating component in lieu of or in addition to a color-generating vehicle component. If both the vehicle and filler contain a color-generating component, the latent, sensitizing ink may be developed by a plurality of distinct color-activating components.

In addition to or in lieu of the above-noted color-generating components, an additional color-generating component or mixture of color-generating components can be incorporated into the ink formulation. Thus, the ink formulation can comprise a transition metal salt such as the nitrates, sulfates or halides of the transition metals, DTO or DTO derivatives, the polyhydric phenols or the leuco dyes all of which are known in the art as color-generating/color-activating components.

If more than one color-generating component is used in the ink formulation, care must be taken to see that the components do not prematurely react with each other. Thus generally a transition metal salt and a DTO derivative would not be incorporated in the same formulation. Similarly an acidified clay and a leuco dye would not be combined. Typically, the ink may contain a transition metal ion and an acidified clay so that the ink can be developed by either a DTO or other metal complexing compound or by a leuco dye or both.

As noted previously, the inks can contain ingredients, such as varnish, to modify further the tack, viscosity and other rheological properties of the ink. Additional conventional ingredients such as antioxidants, lubricants, optical brighteners, dyes, waxes, buffers, wetting agents, odorants and the like can be added as necessary and generally comprise in total less than about 10% by weight of the total composition. For example, the ink may require up to about 7% by weight antioxidant. However, the amount is generally about 2.5% by weight or less, with the remaining additives ranging up to about 2% by weight and preferably less than about 0.5% by weight.

A preferred improved ink formulation comprising the polymeric, hydrocarbon, thermoplastic terpene resin would comprise about 5 to 55%, and preferably about 30 to 45%, by weight vehicle component which is a non-polymeric, oleophilic, organic Arrhenius acid anion having a cationic counter ion, such as nickel-2-ethylhexoate, 20 to 30% by weight polymeric, hydrocarbon thermoplastic terpene resin, e.g. Piccolyte resin, about 5 to 15% by weight particulate filler, up to about 30% by weight thinner, and about 1% by weight antioxidant.

The inks of the present invention can be prepared using conventional ink milling equipment. Generally the ink is prepared by admixing all of the ingredients and blending to form a homogeneous mixture of working consistency suitable for an ink mill. In some cases the amount of particulate filler may be such that only a portion of the filler can be added before the ink is milled. The admixture is then run through an ink mill such as a three-roll ink mill or other conventional ink mill until a homogeneous tacky-viscous fluid is formed. Any remaining filler is then added and the mixture further milled to form a homogeneous dispersion. The particle size in the final mixture should be about 10 micrometers, or less, for ease of application by conventional printing methods. Other liquid ingredients as previously noted can be added to the milled ink to adjust the tack, viscosity and other rheological properties of the ink as required.

The inks of this invention can be applied to selected areas of substrates such as paper by conventional printing techniques, including lithography, flexography, letterpress, dry offset, rubber plate, intaglio, silk screen, rotogravure, and the like. Applying these ink compositions with conventional printing equipment makes it practical to pattern or spot coat substrates, and thus, selectively sensitize paper or other substrates for business forms applications where there is a desire to have an image appear only on certain portions of a form or on certain sheets of a multi-sheet form, such as invoice and purchase order forms where price or cost information is needed only on certain sheets of the multi-sheet form.

The sensitized areas of the substrates can then be developed by contacting the sensitized area, or a portion of the area, with a color-activating component. Typically, the color-activating component is contained as an encapsulated component on a sheet of paper, e.g., a CB (coated back) sheet, so that when the CB sheet is placed in contact with the sensitized sheet and the capsules ruptured, as by writing or typing on the obverse surface of the CB sheet, the color-activating component contacts the sensitized area, or a portion thereof, containing the color-generating component and a visible image is formed.

Alternatively, the sensitized areas can be contacted with a crayon, or developing solution contained in a marking pen, which contains a color-activating component and the sensitized area visibly developed.

Business forms which are multi-sheet forms can comprise one or more CB sheets overlying and in register with one or more sensitized CF (coated front) sheets. Thus a multi-sheet form may have a CB sheet as the top sheet overlying one or more sheets in register which are CB sheets having at least a part of the obverse surface sensitized. Writing or typing on the obverse surface of the top sheet causes like information to be recorded in the obverse sensitized portions of the underlying sheets which are in register with the written or typed information entered on the top sheet of the multi-sheet form.

In addition to the latent, sensitizing ink applied to the surface of the sheets, conventional printing can be applied to the sheets in the sensitized or unsensitized areas to provide forms for business entries, paper based feedback systems for educational use and the like.

The following examples further illustrate the present invention. In these Examples, all parts and percents are by weight, unless otherwise indicated.

EXAMPLE 1

An ink for sensitizing selected areas of paper with a latent coreactant was prepared having the following formulation:

|  | Weight % |
| --- | --- |
| Nickel Rosinate | 24.0 |
| Alumina Hydrate | 48.0 |
| Antioxidant (Thiourea) | 4.0 |
| Hydrocarbon oil (Magie Oil #520, Magie Bros. Oil Co.) | 24.0 |

The above ingredients were mixed into a wet cake and ground on a laboratory three-roll ink mill. A total of 10 passes were made increasing pressure every second pass. Particle size was less than 7.0 micrometers as measured with a N.P.I.R.I. G-1 grindometer. Ink tack values measured by a Thwing-Albert Inkometer at 32° C. were 6.5 at 400 rpm, 8.0 at 1200 rpm, and 10 at 2000 rpm.

The ink was applied to 16 lb. bond paper by a hand roller in selected areas of the sheet. After drying at room temperature, the sensitized sheets were developed by placing a sheet coated with an encapsulated dithiooxamide derivative ("3M" Brand Carbonless Paper, Type 200 CB [coated back] sheet) so that the capsule coating and the inked surfaces were in direct contact. The sheets were run through a steel pressure roll to develop uniformly a 1.2 cm wide strip of the sensitized sheet. The developed area had an acceptable blue-purple color as determined by optical density measurements.

Sensitized sheets were also developed by placing a sheet coated with an encapsulated dithiooxamide derivative (CB sheet described above) so that the capsule coating and the inked surfaces were in direct contact. Images were produced on the sensitized sheet by writing on the obverse surface of the CB sheet with a ball-point pen using normal hand pressure. Similarly, typing on the obverse surface of the CB sheet produced an image on the sensitized sheet. In both cases image formation was very rapid.

EXAMPLE 2

A latent, sensitizing ink was prepared having the following formulation:

|  | Weight % |
|---|---|
| Nickel Rosinate | 23.3 |
| Alumina Hydrate | 52.0 |
| Antioxidant ("Ionox 330", Shell Chemical Co.) | 1.5 |
| Hydrocarbon oil (Magie #520) | 22.8 |
| Oleic Acid | 0.4 |

Ingredients were mixed into a wet cake and ground on a 1 lb. Charles Ross three-roll ink mill into a homogeneous tacky, viscous fluid. Particle size was less than 2.0 micrometers as measured with a N.P.I.R.I. G-1 grindometer. Ink tack values measured by a Thwing-Albert Inkometer at 32° C. were 6.5 at 400 rpm, 12 at 1200 rpm, and 15.25 at 2000 rpm.

Two 200 g samples of ink were printed on 16 lb. bond paper in selected areas with sheet and web fed presses using the lithographic process. Several hundred sheets were printed and stacked without smudging or set-off. The sensitized sheets could be readily developed as in Example 1.

EXAMPLE 3

Latent, sensitizing inks containing varnish were prepared and used to sensitize selected areas of paper sheets. The inks were formulated as follows:

|  | Weight Percent | | |
|---|---|---|---|
|  | I | II | III |
| Nickel Rosinate | 25.0 | 24.0 | 15.0 |
| Alumina Hydrate | 50.0 | 48.0 | — |
| Alumina (Paper Grade Alumina, Reynolds Metals Co.) | — | — | 40.0 |
| Hydrocarbon Oil | | | |
| Magie #520 | 19.5 | 19.0 | — |
| Magie #535 | — | — | 16.0 |
| Varnish | | | |
| Diamond #683 (Diamond Varnish Co.) | — | — | 25.0 |
| "LV-2039" (Lawter Chem.) | 2.5 | — | — |
| SKP-104 Polyurethane alkyd (Sun Chemical Corp.) | — | — | 4 |
| Rubber base varnish ("VZ 1903," Sinclair & Valentine Co., Inc.) | — | 7 | — |
| Antioxidant (Thiourea) | 3 | 2 | — |
| Fineness of Grind, micrometers | 0.5-1.5 | 0.5-1.5 | 8 |
| Tack at 400 rpm | 9.5 | 9.0 | — |
| 1200 rpm | 13.5 | 13.5 | — |

-continued

|  | Weight Percent | | |
|---|---|---|---|
|  | I | II | III |
| 2000 rpm | 18.5 | 19.0 | — |

Each ink formulation was blended by hand into a wet cake and placed on a three-roll ink mill and ground to the indicated particle size. One hundred gram samples of each formulation were printed with a sheet-fed lithographic press. A few hundred impressions were made, sensitizing selected areas on 16 lb. bond paper sheets. Samples of the sensitized sheets were developed as in Example 1. Development of images on the sensitized sheets was less rapid than in Example 1, although an acceptable image was obtained within about 4 seconds.

EXAMPLE 4

A latent sensitizing ink which can be developed with conventional metal salt coreactants and also leuco dyes was prepared having the following formulation:

|  | Weight % |
|---|---|
| Nickel Rosinate | 13.6 |
| Attapulgite Clay | 16.3 |
| Alumina (PGA) | 30.9 |
| Hydrocarbon Oil (Magie #535) | 14.5 |
| Varnish (Diamond #683, Diamond Varnish Co.) | 23.6 |
| SKP-104 (Polyurethane Alkyd, Sun Chemical Co.) | 1.1 |

The nickel rosinate, varnish and hydrocarbon oil were milled on a small laboratory three-roll ink mill into a homogeneous tacky, viscous fluid. To this were added the paper grade alumina and attapulgite clay which were milled into a homogeneous dispersion. Particle size or fineness of grind as measured by a N.P.I.R.I. G-1 grindometer was less than 10 micrometers.

The ink was applied to 16 lb. bond paper in selected areas by a hand roller. After drying at room temperature, the sensitized sheets were coreacted separately with sheets containing a dithiooxamide color activating compound (3M Brand Carbonless Paper, CB sheet) or leuco dyes (NCR Carbonless Paper CB [coated black] sheet, National Cash Register Company, Inc.). The developed areas were blue in color when the coreactant sheet having the leuco dye was used, and blue-purple in color when the coreactant sheet having the dithiooxamide derivative was used. Development of the sensitized areas was slightly slower than in Example 1.

EXAMPLE 5

A latent, sensitizing ink was prepared having the following formulation:

| Ingredient | Weight % |
|---|---|
| Sodium rosinate | 20.0 |
| Attapulgite Clay | 50.0 |
| Antioxidant (Ionox 330) | 1.0 |
| Hydrocarbon oil (Magie #535) | 28.0 |
| Oleic acid | 1.0 |

The ingredients were blended by hand into a wet cake, then ground on a three-roll ink mill to a particle size of 5.0 micrometers.

The ink was applied to 16 lb. bond paper by a hand roller. After drying at room temperature the sensitized sheets were developed by contacting with a sheet containing a leuco dye as in Example 4. The sensitized areas developed rapidly and exhibited a visible and intense reddish-blue color.

EXAMPLE 6

Latent sensitizing inks comprising oleophilic metal sulfonate coreactants were prepared having the following formulations.

|  | Weight % | | | |
| --- | --- | --- | --- | --- |
|  | A | B | C | D |
| Nickel dinonylnaphthalene sulfonate | 24.4 | 12.2 | — | — |
| Copper dinonylnaphthalene sulfonate | — | — | 24.4 | 12.2 |
| Nickel rosinate | — | 12.2 | — | 12.2 |
| Alumina hydrate | 53.8 | 53.8 | 53.8 | 53.8 |
| Antioxidant ("Ionox 330") | 1.4 | 1.4 | 1.4 | 1.4 |
| Hydrocarbon oil (Magie #520) | 20.0 | 20.0 | 20.0 | 20.0 |
| Oleic acid | 0.4 | 0.4 | 0.4 | 0.4 |

The ingredients were hand blended into a wet cake and ground on a three-roll ink mill to a particle size of 5 to 7 micrometers. The ink was applied to 16 lb. bond paper with a hand roller. After drying at room temperature, the sensitized areas were developed as in Example 1. Formulations A and B provided purple and reddish purple developed areas respectively, while samples C and D each produced a green color in the developed area.

EXAMPLE 7

A latent, sensitizing ink was prepared having the following formulation:

|  | Weight % |
| --- | --- |
| Nickel 2-ethylhexoate | 55.0 |
| Krumbhaar resin ("K-484", Lawter Chemical Co.) | 6.0 |
| Hydrocarbon oil ("535" oil, Magie Bros.) | 9.0 |
| Alumina ("1326", Kohnstamm Co.) | 30.0 |

The resin and hydrocarbon oil were heated and blended, and allowed to cool. The blended liquid component was then combined with the nickel 2-ethylhexoate and the alumina. The combined ingredients were milled on a three-roll ink mill to obtain a fluid of printing ink consistency.

The ink was applied to paper by means of a hand brayer to sensitize the surface of the paper. After drying, the sensitized surface of the sheets was developed. In one case an alcoholic solution of a dithiooxamide derivative was spread on the sensitized area with a cotton swab. The sensitized portions of other sheets were developed by placing a sheet coated with an encapsulated dithiooxamide derivative (3M Brand Carbonless Paper, Type 200 CB sheet) so that the capsule coating and the sensitized surface of the sheet were in direct contact. A stylus was used to apply pressure on the obverse surface of the sheet to crush the capsules in the CB sheet and allow the encapsulated dithiooxamide derivative to contact the sensitized area of the printed sheet. In both of the above cases the contacted areas of the sensitized sheet developed to provide a blue-purple color.

The latent ink was also printed onto selected areas of paper sheets with a lithographic press (AMF 1250 press). The sensitized portions of the sheets were developed using a CB sheet as described above. The developed areas provided a blue-purple color.

EXAMPLE 8

An ink for sensitizing selected areas of paper with a latent coreactant was prepared having the following formulation:

|  | Wt. % |
| --- | --- |
| Nickel-2-ethylhexoate | 38.5 |
| Hydrophobic silica filler (Aerosil R-972, Degussa, Inc.) | 11.5 |
| Polymeric terpene resin (Piccolyte S-135) | 25.4 |
| Butylated hydroxy toluene (antioxidant) | 1.0 |
| Hydrocarbon Oil (Magie Oil #520) | 23.6 |

The nickel-2-ethylhexoate, terpene resin and antioxidant were dissolved in the hydrocarbon oil. The filler was then dispersed in the solution and the final dispersion milled on a three-roll ink mill to a particle size of about 3 micrometers or less. The composition could be satisfactorily printed on a wet offset or dry offset press and was satisfactorily developed by a CB sheet as described in Example 1.

EXAMPLE 9

An ink for sensitizing selected areas of paper with a latent coreactant and particularly adapted for application by a dry offset press was prepared having the formulation shown in Example 8 except that a non-hydrophobic silica filler (Cab-O-Sil M-5) was substituted for the Aerosil R-972 filler. This composition was satisfactorily printed on a dry offset press and was satisfactorily developed by a CB sheet as in Example 1.

What is claimed is:

1. A latent printing ink for providing latent, sensitized areas on substrates, which ink can be applied to a paper substrate by a printing press and subsequently developed with a pressure-releasable, encapsulated, color-activating compound carried on a substrate, said ink comprising, based on the weight of the total ink composition, about 5 to 55% by weight of a vehicle component which is a non-polymeric, oleophilic, organic proton donor acid anion having a cationic counter-ion, 20 to 30% by weight of a polymeric, hydrocarbon, thermoplastic terpene resin, up to about 70% by weight particulate filler and up to about 30% by weight thinner and wherein said ink includes at least 5% by weight of at least one color-generating component, the ratio of said filler to said non-polymeric vehicle component being from about 0.1:1 to 6:1.

2. A latent ink according to claim 1 wherein said anion is selected from the group consisting of aliphatic, alicyclic and aromatic carboxylic and sulfonic acid anions and mixtures thereof.

3. An ink according to claim 1 wherein said cationic counter-ion is a transition metal ion.

4. An ink according to claim 2 wherein said metal ion is selected from the group consisting of nickel, copper, iron and cobalt.

5. An ink according to claim 1 wherein said filler comprises an acidified clay.

6. An ink according to claim 1 wherein said thinner is a hydrocarbon oil.

7. A latent printing ink for providing latent sensitized areas on substrates which ink can be applied to a paper substrate by a printing press and subsequently developed with a pressure-releasable encapsulated color-activating component carried on a substrate, said ink comprising, based on the weight of the total ink composition about 30 to 45% by weight of color-generating vehicle component which is a non-polymeric, oleophilic, organic proton donor, acid anion having a transition metal counter-ion about 20 to 30% by weight polymeric, hydrocarbon, thermoplastic terpene resin, about 5 to 15% by weight particulate filler, and about 10 to 25% by weight thinner, the ratio of said filler to said non-polymeric vehicle component being from about 0.1:1 to 1:1.

8. An ink according to claim 7 wherein said color-generating, non-polymeric vehicle component is nickel-2-ethylhexoate.

9. A sheet having selected areas on at least one major surface sensitized with the latent, sensitizing ink of claim 1.

10. A sheet according to claim 9 wherein the sensitized surface is the obverse surface of the sheet and the reverse surface carries a color-activating component.

11. A multi-sheet form comprising a first sheet having on the reverse surface a color-activating component and, underlying said first sheet, a second sheet having at least a portion of the obverse surface sensitized with the latent, sensitizing ink of claim 1.

* * * * *